United States Patent
Moothoor et al.

(10) Patent No.: US 11,200,085 B2
(45) Date of Patent: Dec. 14, 2021

(54) SHARING TRANSACTION CONTEXTS IN AN OPTIMIZED COLOCATION OF JAVA AND NON-JAVA LANGUAGE APPLICATIONS

(71) Applicant: INTERNATIONAL BUSINESS MACHINES CORPORATION, Armonk, NY (US)

(72) Inventors: Jithesh Moothoor, Bangalore (IN); Gopalakrishnan P, Bangalore (IN); Hariharan N. Venkitachalam, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 16/678,304

(22) Filed: Nov. 8, 2019

(65) Prior Publication Data

US 2020/0073700 A1   Mar. 5, 2020

Related U.S. Application Data

(63) Continuation of application No. 15/400,396, filed on Jan. 6, 2017, now Pat. No. 10,558,488.

(51) Int. Cl.
*G06F 9/46* (2006.01)
*G06F 9/445* (2018.01)
*G06F 9/455* (2018.01)

(52) U.S. Cl.
CPC .............. *G06F 9/466* (2013.01); *G06F 9/445* (2013.01); *G06F 9/45504* (2013.01)

(58) Field of Classification Search
None
See application file for complete search history.

(56) References Cited

U.S. PATENT DOCUMENTS 6,470,436 B1   10/2002 Croft et al.
6,823,358 B1 * 11/2004 Spender ................. H04L 29/06
                                                 707/999.103

(Continued)

OTHER PUBLICATIONS

"Interoperability", http://documentation.microfocus.com/help/index.jsp?topic=%2Fcom.microfocus.eclipse.infocenter.visualcobol.eclipseux%2FH2IOIOIOPY00.html, Accessed Jul. 27, 2016, 1 page.

(Continued)

*Primary Examiner* — Lewis A Bullock, Jr.
*Assistant Examiner* — Melissa A Headly
(74) *Attorney, Agent, or Firm* — Nicholas Bowman; Andrew D. Wright; Roberts Calderon Safran & Cole, P.C

(57) ABSTRACT

Systems and methods for sharing transactional context between Java and traditional language applications are disclosed. In embodiments, a method comprises: receiving, by a computing device, a transaction request to execute a program, wherein the program comprises non-Java program components and Java program components; executing, by a transaction middleware of the computing device, the non-Java program components; contacting, by the transaction middleware, a resource manager server and registering with the resource manager server using global transaction ID data; transferring, by the transaction middleware of the computing device, the Java program components to a transaction coordinator of the computing device, along with thread ID data and the global transaction ID data; and storing, by the transaction coordinator, the thread ID data and global transaction ID data in a recoverable transaction log store.

20 Claims, 10 Drawing Sheets

(56) References Cited

U.S. PATENT DOCUMENTS

| | | | |
|---|---|---|---|
| 8,972,802 B2 | 3/2015 | Kashyap et al. | |
| 2012/0144388 A1 | 6/2012 | Kurian et al. | |
| 2013/0066948 A1* | 3/2013 | Colrain .................. | H04L 67/42 |
| | | | 709/203 |
| 2015/0088956 A1 | 3/2015 | Deshpande et al. | |
| 2015/0309834 A1* | 10/2015 | Shen ....................... | G06F 9/466 |
| | | | 718/101 |

OTHER PUBLICATIONS

"Project Plan—Port Cobol and C Applications to Java EE", http://libertp.bull.com/project-plan-porting-cobol-c-to-java-ee/, Accessed Jul. 27, 2016, 3 pages.

"RES—An Open Cobol to Java Translator", http://sourceforge.net/projects/opencobol2java/, Accessed Jul. 27, 2016, 4 pages.

Hadi et al., "EDB Advances on XA Compatibility", https:/lwww.enterprisedb.com/blog/edb-advances-xa-compatibility, EDB Postgres, The EDB Blog, Mar. 25, 2015, 4 pages.

List of IBM Patents or Patent Applications Treated as Related, dated Nov. 7, 2019, 1 page.

\* cited by examiner

SHARING TRANSACTION CONTEXTS IN AN OPTIMIZED COLOCATION OF JAVA AND NON-JAVA LANGUAGE APPLICATIONS

BACKGROUND

The present invention relates generally to middleware and, more particularly, to middleware for optimizing collocation of Java and non-Java language applications.

Enterprises or business organizations utilize many different software components to manage the Quality of Service (computer network performance) required by their core and critical applications. Enterprise application software (EAS) is computer software used to satisfy the needs of an organization. Enterprise middleware software provides services such as concurrency, transactions, threading, messaging and security for enterprise applications.

One example of a middleware software component is a distributed transaction processing product that follows a process-based architecture and supports hosting of CICS based COBOL, C/C++, PL/I and Java applications. Such distributed transaction processing systems allow Java applications to run as a transaction. Transaction processing usually requires coordination of multiple program run-times such as C, Java, COBOL, PL/I. The transaction flow from multiple language runtimes can be decided dynamically, and the transaction processing facility on the transaction environment creates a challenge to load the language run-time in a transaction processing heap storage area.

Distributed transaction processing systems following a process-based architecture allow for the running of multiple applications, such as COBOL, C/C++, PL/I and Java all co-located in the same environment. Such systems initialize an appropriate language run time in each of the operating system process forced by the middleware, prior to executing the application. For example, if the application is based on Java, a Java Virtual Machine (JVM) is initialized in every independent process managed by the middleware. While this is an acceptable architecture for applications that have relatively few requirements of scaling, the transaction can be defined as a change of state of a system where the change state confirms to ACID (Atomicity, Concurrence, Isolation and Durability) properties of the database transaction. Therefore, to maintain the ACID properties, the current infrastructure in transaction processing allows JVM to load as part of its process space to execute Java programs. Although the current method supports the ACID properties and maintains transaction context across language run-times, it becomes a challenge for applications that need large scaling requirements, due to: (1) high resource usage by every JVM initialized in each process (large memory usage, CPU usage, etc.); (2) slow startup (as the JVM initialization is a slow process); and (3) the JVM itself is multithreaded and the Java applications are designed to leverage the Thread model.

SUMMARY

In an aspect of the invention, a computer-implemented method for sharing transactional context between a Java application and process-based application includes: receiving, by a computing device, a transaction request to execute a program, wherein the program comprises non-Java program components and Java program components; executing, by a transaction middleware of the computing device, the non-Java program components; contacting, by the transaction middleware, a resource manager server and registering with the resource manager server using global transaction ID data; transferring, by the transaction middleware of the computing device, the Java program components to a transaction coordinator of the computing device, along with thread ID data and the global transaction ID data; and storing, by the transaction coordinator, the thread ID data and global transaction ID data in a recoverable transaction log store.

In another aspect of the invention, there is a computer program product for sharing transactional context between a Java application and a process-based application. The computer program product comprises a computer readable storage medium having program instructions embodied therewith. The program instructions executable by a computing device to cause the computing device to: receive a transaction request to execute a program, wherein the program comprises non-Java program components and Java program components; execute, by a transaction middleware of the computing device, the non-Java program components; contact, by the transaction middleware, a resource manager server and register with the resource manager server using global transaction ID data; transfer, by the transaction middleware of the computing device, the Java program components to a transaction coordinator of the computing device, along with thread ID data and the global transaction ID data; and store, by the transaction coordinator, the thread ID data and global transaction ID data in a recoverable transaction log store.

In another aspect of the invention, there is a system for sharing transactional context between a Java application and a process-based application. The system includes a CPU, a computer readable memory and a computer readable storage medium associated with a computing device. The system also includes: program instructions to receive a transaction request to execute a program, wherein the program comprises non-Java program components and Java program components; program instructions to execute, by a transaction middleware of the computing device, the non-Java program components; program instructions to contact, by the transaction middleware, a resource manager server and register with the resource manager server using global transaction ID data; program instructions to transfer, by the transaction middleware of the computing device, the Java program components to a transaction coordinator of the computing device, along with thread ID data and the global transaction ID data; program instructions to store, by the transaction coordinator, the thread ID data and global transaction ID data in a recoverable transaction log store; program instructions to contact, by the transaction coordinator, a Java Virtual Machine (JVM) of the computing device, to execute the Java program component; program instructions to execute, by the JVM, the Java program component, wherein the Java program component communicates with the resource manager server; program instructions to send, by the JVM, updated thread ID data to the transaction coordinator; and program instructions to log, by the transaction coordinator, the updated thread ID data and global transaction ID data, wherein the updated thread ID data is mapped to the global transaction ID data; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
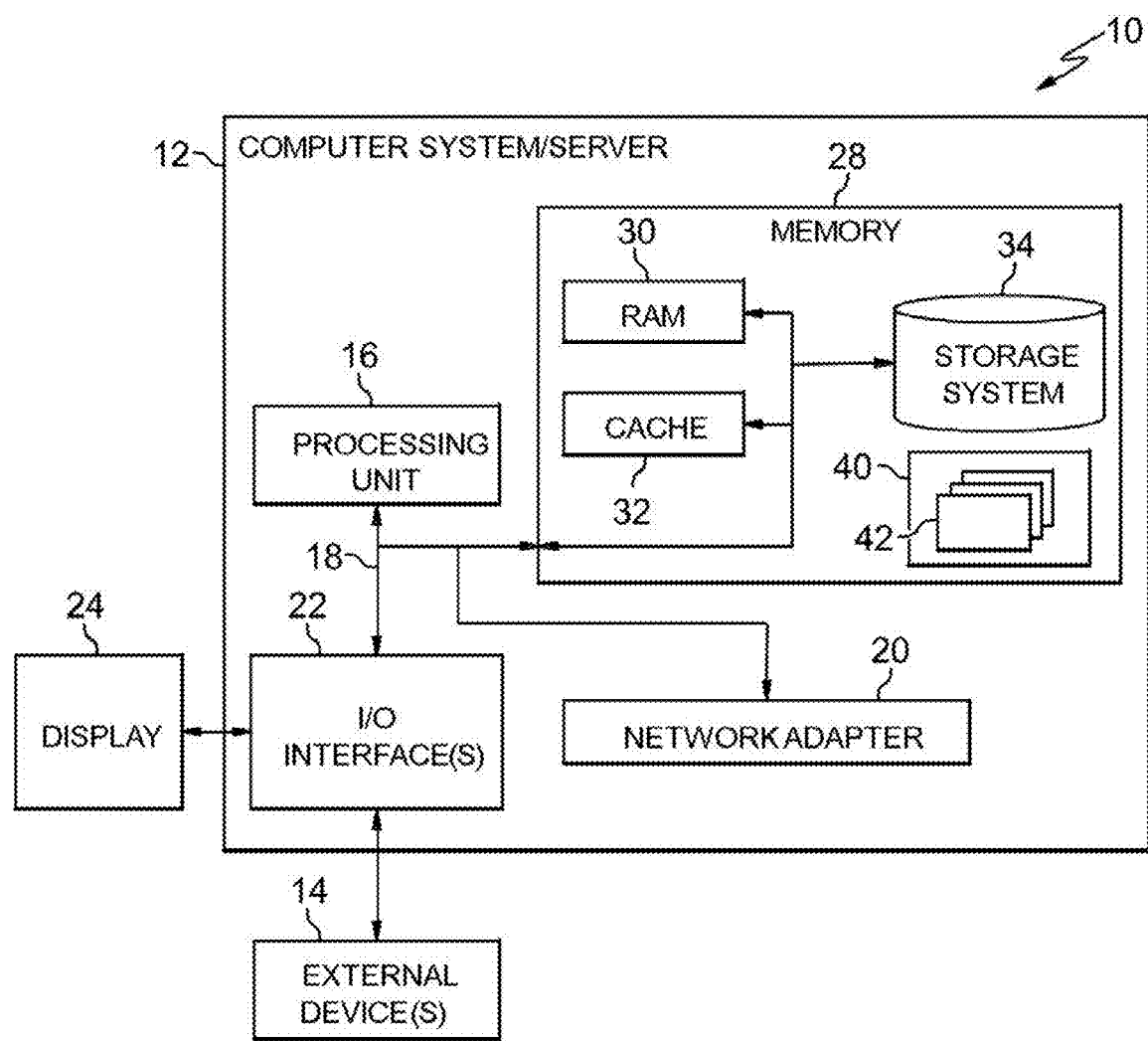
FIG. 1 depicts a computing infrastructure according to an embodiment of the present invention.

The present invention relates generally to middleware and, more particularly, to middleware for optimizing collocation of Java and non-Java language applications. In embodiments, the present invention provides a system and method for sharing transactional context between Java Standard Edition (SE) and traditional or native language applications in an architecture that seamlessly merges thread model architecture into process model architecture. In aspects, the present invention provides methods to share transactional context with a common Java Virtual Machine (JVM) server (multi-threaded environment) to service requests when invoked from a pool of independent application server processes (process model architecture). In aspects, methods of the present invention comprise an optimized transaction interaction style based on a two-phase commit protocol referred to as eXtended Architecture (XA) open standard protocol, for a distributed transactional middleware across a common JVM server and a set of independent pool of application server processes. The system may enable the hosting or co-locating of Java applications with non-Java based applications in the same middleware environment. The system may also enable the sharing of transaction context across Java 2 Platform, Standard Edition (J2SE) JVM container and traditional language runtime in an environment involving thread and process based distributed architecture.

In embodiments, the present invention provides optimized transactional interactions based on XA open standard protocol across process and thread based architecture models. In embodiments, the present invention provides a method for handling recovery conditions by creating interaction protocols across the common JVM and multiple process based application server processes. In this manner, implementation of the invention provides an optimized interaction with full transaction control across two discrete environments that are based on the process and threaded architecture models, respectively. In embodiments, methods of the invention provide a scalable and performance centric architecture that is critical for business applications running on transactional middleware environments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
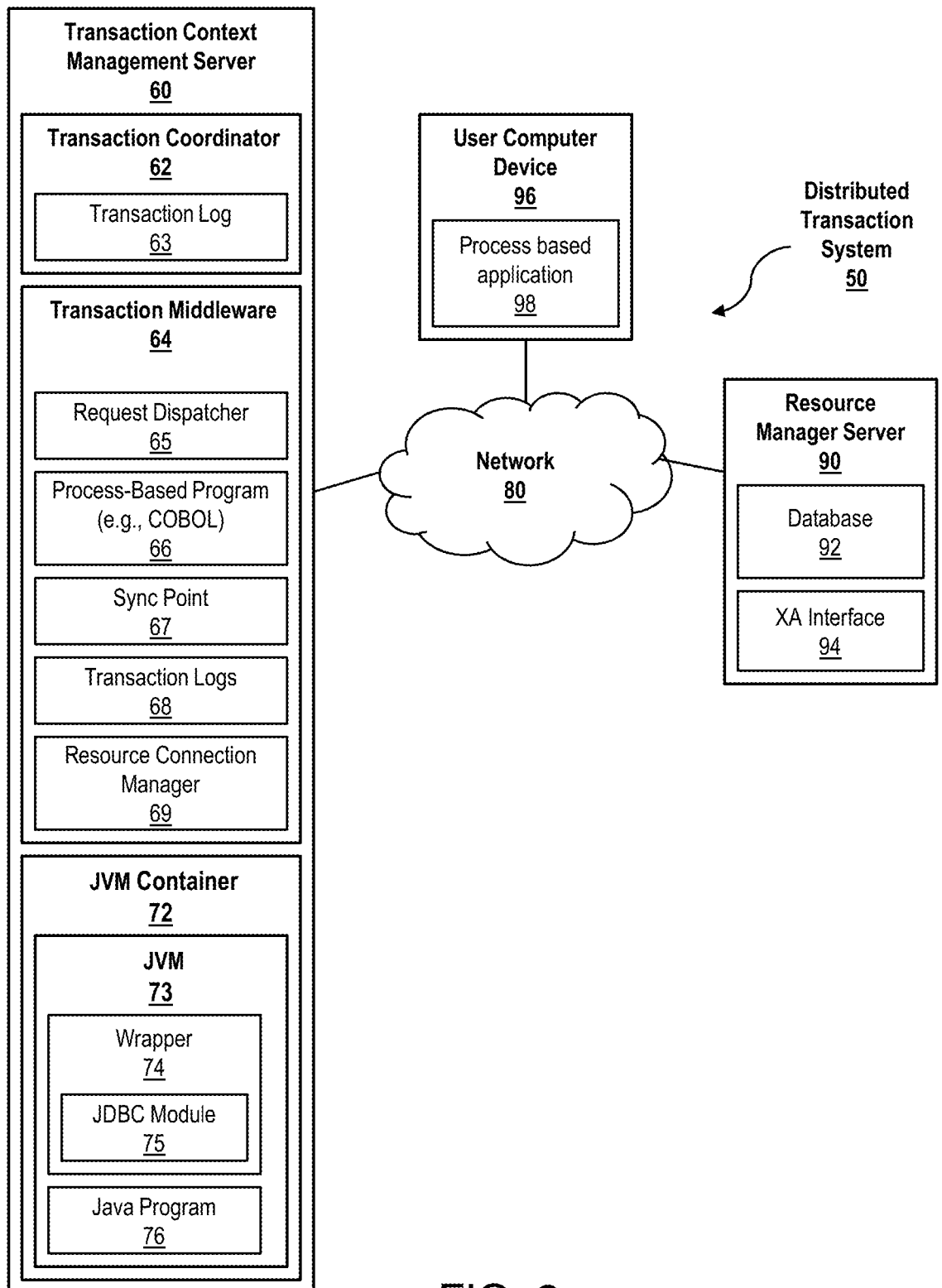
FIG. 2 shows an exemplary distributed transaction system in accordance with aspects of the invention.

FIG. 2 shows an exemplary distributed transaction system 50 in accordance with aspects of the invention. The distributed transaction system 50 includes a transaction context management server 60 connected to a network 80. The transaction context management server 60 may comprise a computer system 12 of FIG. 1, and may be connected to the network 80 via the network adapter 20 of FIG. 1. The transaction context management server 80 may be configured as a special purpose computing device to provide context management services. For example, the transaction context management server 80 may be in communication with a resource manager server 90 and a user computer device 96 through the network 80, and may be configured to receive a transaction request from the user computer device 96 to execute a process-based application including a Java program component.

The network 80 may be any suitable communication network or combination of networks, such as a local area network (LAN), a general wide area network (WAN), and/or a public network (e.g., the Internet). The user computer device 96 may be a general purpose computing device, such as a desktop computer, laptop computer, tablet computer, smartphone, etc., and may include components of the computer system 12. In embodiments, the user computer device 96 includes a process based application 98 including a Java program component. The resource manager server 90 may also be a general purpose computing device, such as a desktop computer, laptop computer, tablet computer, smartphone, etc., and may include components of the computer system 12. In embodiments, the resource manager server 90 includes a database 92 and a XA interface 94.

Still referring to FIG. 2, in aspects, the transaction context management server 60 includes a transaction coordinator 62 in communication with a transaction middleware 64. In aspects, the transaction middleware 64 includes a request dispatcher 65, a process-based program 66, a sync point module 67, transaction log storage 68 and a resource connection manager 69.

In embodiments where a business application uses two or more XA resources, an external transaction manager (sync point module 67) coordinates the updates to all the resource managers in a global transaction. In embodiments, the transaction middleware 64 supports the coordination of resources managers through their XA resource interface, and participates in distributed global transactions with the JVM container 72. The process of transaction middleware 64 issuing transaction resolutions with a 2-phase coordination operation to all XA resource participants including the JVM container 72 utilizing the sync point module 67 is referred to as a sync point operation.

In embodiments, the transaction log 68 maintains the transaction state with the transaction ID (global transaction [XID]+thread ID [TID]) in a physical storage medium for transaction recovery operations. During transaction recovery, the transaction middleware 64 has the ability to communicate with all its resource managers and the JVM Container 72 that are in use by applications in the system 50. For each resource manager, the transaction middleware 64 uses the XA recover operation to retrieve the list of transactions currently in a prepared or heuristically completed state.

In the transaction middleware 64, transactions are associated with a transactional resource manager (example, databases, messaging systems) via the XA_START command, and dissociated from the resource via the XA_END command. The resource connection manager 69 helps the transaction middleware 64 connect to an appropriate resource manager using an XA interface.

The transaction middleware 64 may also include additional components or software modules not depicted (e.g., additional worker processes). In aspects, the transaction middleware 64 is configured to receive transaction requests and execute process-based programs. The transaction middleware 64 may operate on a host operating system (i.e., transaction context management server 60) as depicted in FIG. 2, or may be executed by a node, such as user computer device 96. In aspects, the request dispatcher 65 receives requests from end users (e.g., a web rendering request, a document generation request, etc.). The request dispatcher 65 may instruct one or more worker processes to execute the process-based program 66. For example, if an end user requests execution of a program that is written in Common Business-Oriented Language (COBOL), the request dispatcher 65 may instruct worker processes to execute the COBOL program code received from the end user.

In aspects, the transaction coordinator 62 is configured to provide context management services between the transaction middleware 64 and a Java Virtual Machine (JVM) container 72, and includes a transaction log 63 for managing context data. In aspects, the JVM container 72 includes a JVM 73, a wrapper 74, a Java database connectivity (JDBC) module 75 and a Java program 76. The JVM container 72 is a thread-server environment. In aspects, a user (e.g., a user of user computer device 96) requests execution of a program that is written partly in COBOL (see Process-Based Program 66) and partly in Java (see Java program 76). The COBOL program may be executed by the transaction middleware 64, and the Java program may be executable by the JVM 73.

Figure 3:
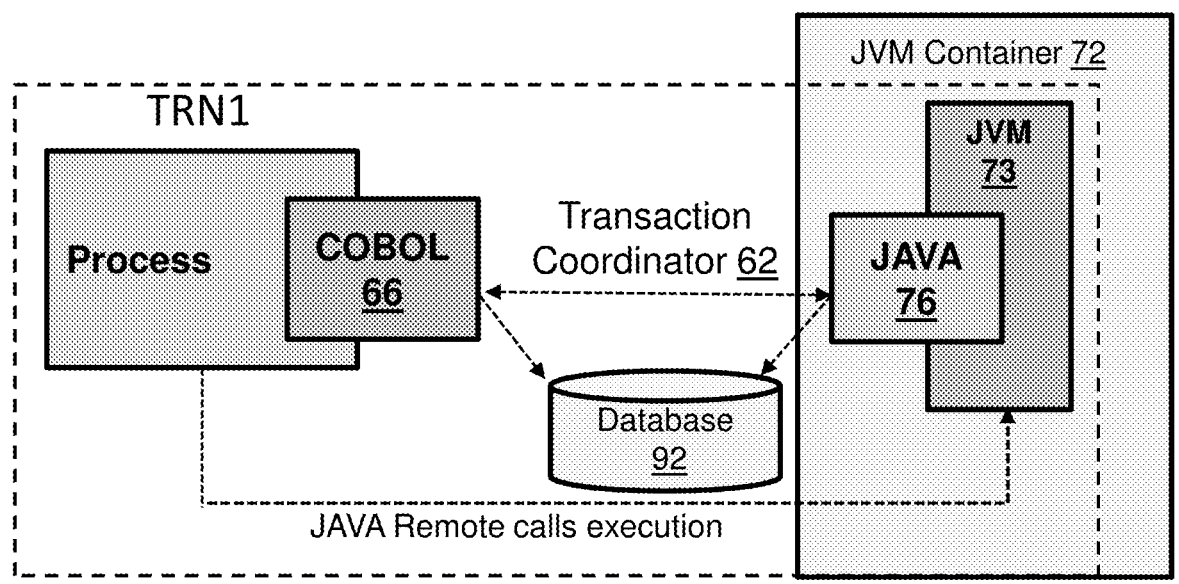
FIG. 3 is a flow diagram describing a single logical unit of work (LUW) in accordance with aspects of the present invention.

FIG. 3 is a flow diagram describing a single logical unit of work (LUW) in accordance with aspects of the present invention. FIG. 3 depicts a high level overview of components involved in this distribution architecture, and depicts an origin of the transaction flow (TRN1) triggered or initiated in a process-based application server process (labeled as "process") and invoking a Java program 76 (e.g., a Java 2 Platform, Standard Edition (J2SE) program) running in the common JVM 73 (multi-threaded).

Figure 4:
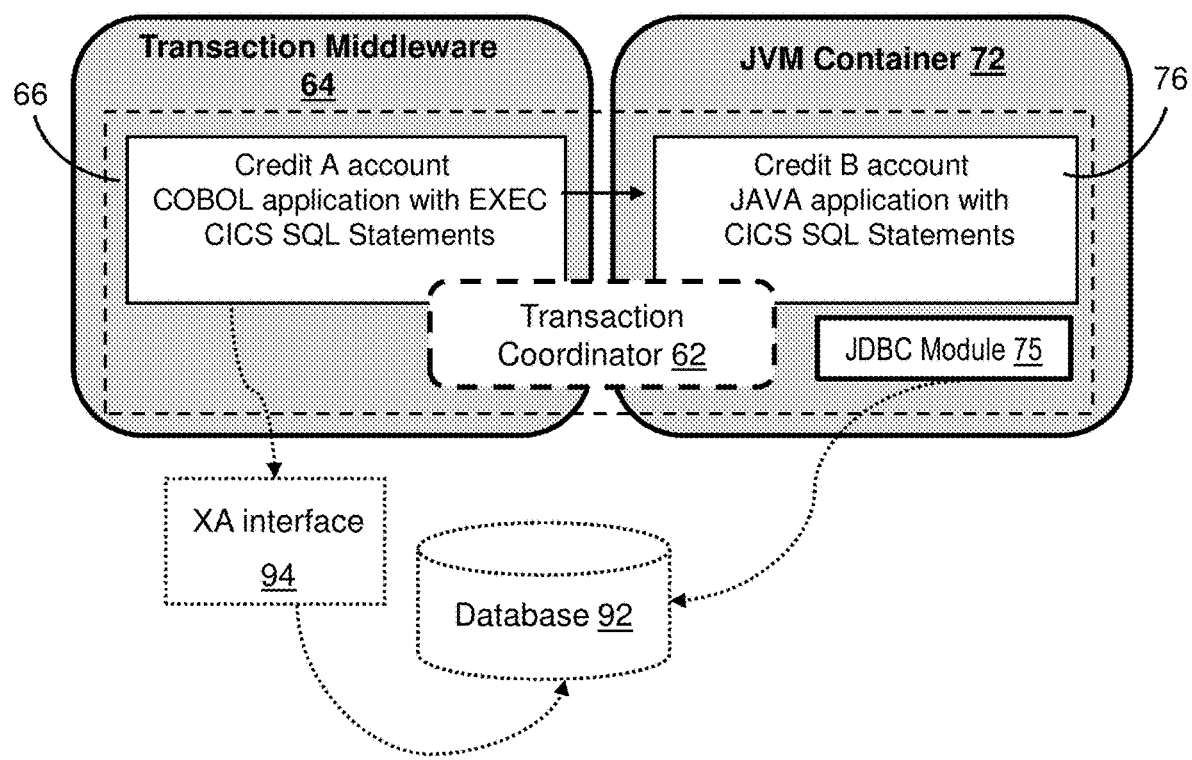
FIG. 4 is a flow diagram describing an exemplary flow in accordance with embodiments of the present invention.

FIG. 4 is a flow diagram describing an exemplary flow in accordance with embodiments of the present invention. FIG. 4 depicts that, upon arrival of a transaction request from a client, the transaction context management server 60 executes the transaction in the transaction middleware 64. In the example shown, the transaction request is a request for a hybrid transaction including a process-based program 66 and a Java program 76. The transaction middleware 64 may comprise a multi-process based middleware environment or process model architecture. In aspects, the transaction middleware 64 transfers the Java program 76 to the transaction coordinator 62 with XID (Global Transaction ID) data and thread ID (TID) data (i.e., transmission ID data). In the example shown, the process-based program 66 is a COBOL program including a command (EXEC CICS SQL Statements) to execute the transaction management middleware 64, which is in the form of customer information control system (CICS®) middleware. The transaction coordinator 62 maintains the XID and TID data in the recoverable transaction log 63. The transaction coordinator 62 further propagates a Java program name to the JDBC module 75 in the JVM container 72 (J2SE JVM container). The JDBC module 75 accepts the Java program 76 and creates a JDBC connection handler thread with the resource manager server 90. The database wrapper 74 in the JVM container 72 returns a result (result from executing the Java program 76) back with the JDBC connection handler thread to the transaction coordinator 62. The transaction coordinator 62 logs JDBC connection handler thread details and TID in the transaction log 63, along with dynamically created XID (XID dynamically created by the transaction coordinator 62). Additional details regarding method steps of the present invention or described with respect to FIG. 7.

Figure 5:
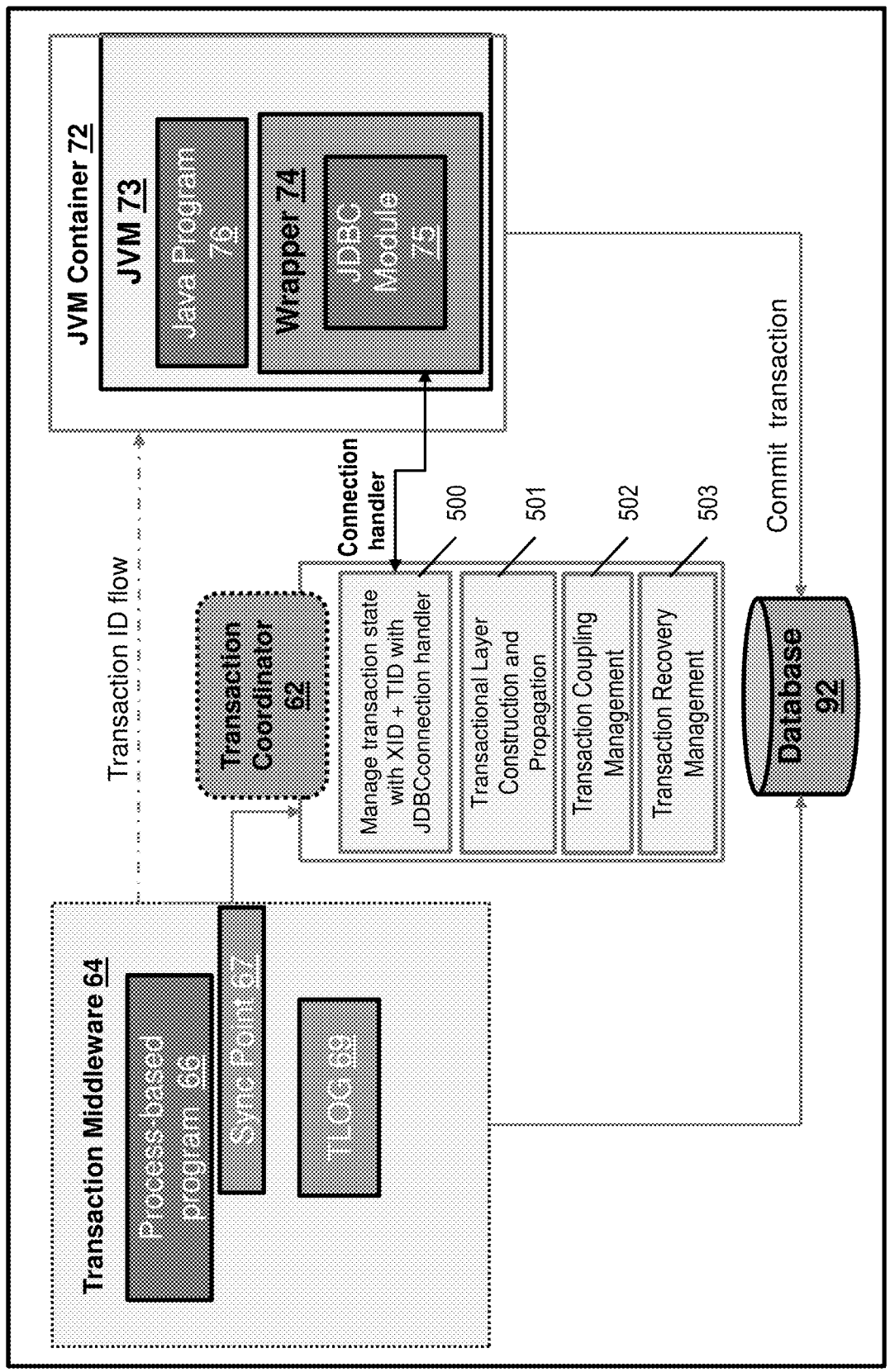
FIG. 5 depicts a flow diagram showing the complete flow of a single transaction, and illustrating various components of the transaction coordinator for handling transactionality in accordance with embodiments of the present invention.

FIG. 5 depicts a flow diagram showing communication between various components involved in the transaction coordinator 62 for handling transactionality. In the embodiment shown, the process-based program 66 is an embedded SQL application. In embodiments, the transaction coordinator 62 includes a plurality of modules, including a module 500 to manage transaction states with XID and TID with a JDBC connection handler; a transactional layer construction and propagation module 501; a transaction coupling management module 502; and a transaction recovery management module 503. As depicted in FIG. 5, the transaction middleware 64 is in communication with the database 92, the transaction coordinator 62, and the JVM container 72. The JVM container 72 is further in communication with the database 92 and the transaction coordinator 62.

Figure 6:
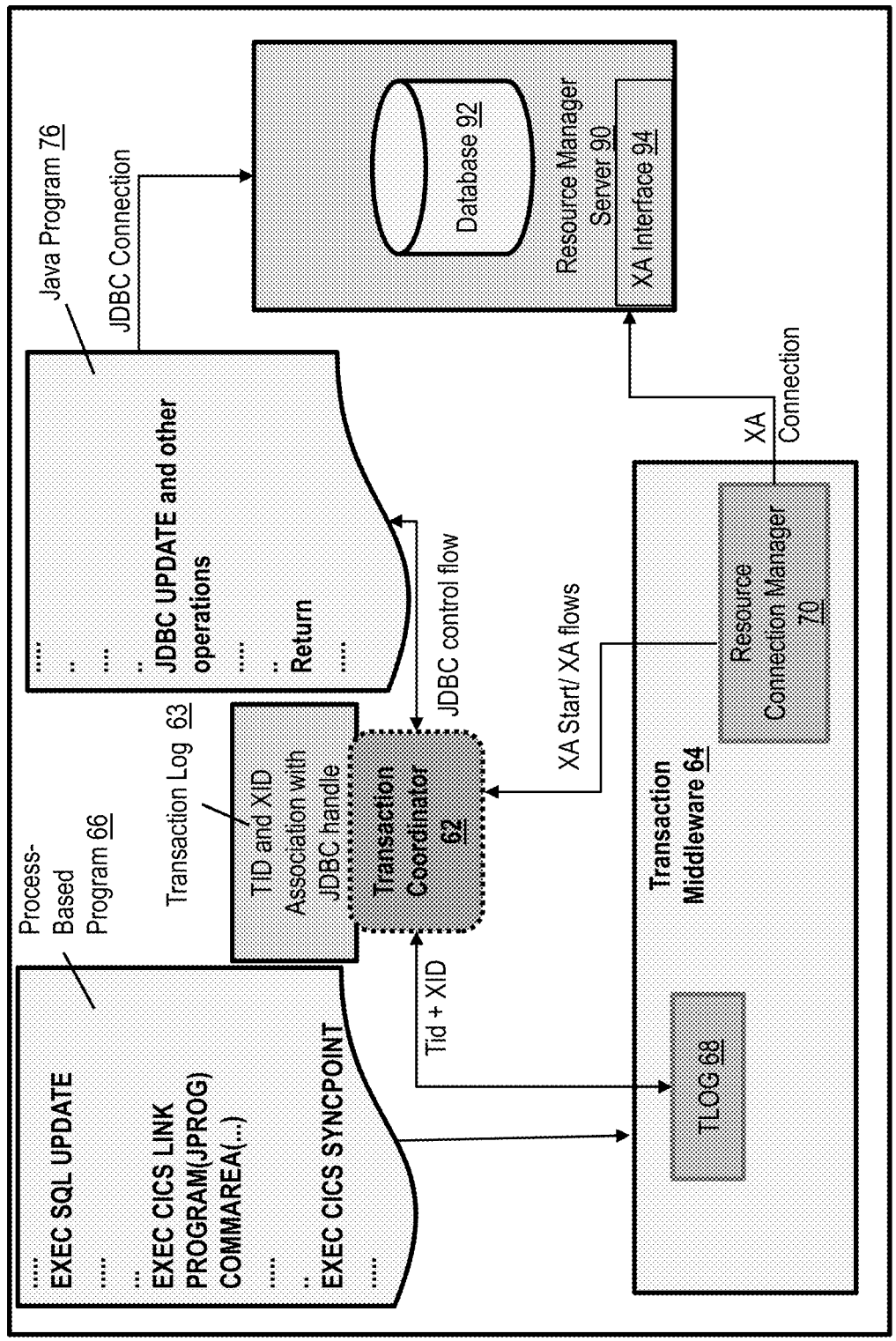
FIG. 6 is a flow diagram illustrating how a transactional native program works with a Java program using a JVM container in accordance with embodiments of the present invention.

FIG. 6 is a flow diagram illustrating how a transactional native program works with a Java program using a JVM container 72 (e.g., J2SE JVM Container). Details of FIG. 6 are discussed below with respect to the method steps of FIG. 7.

Figure 7:
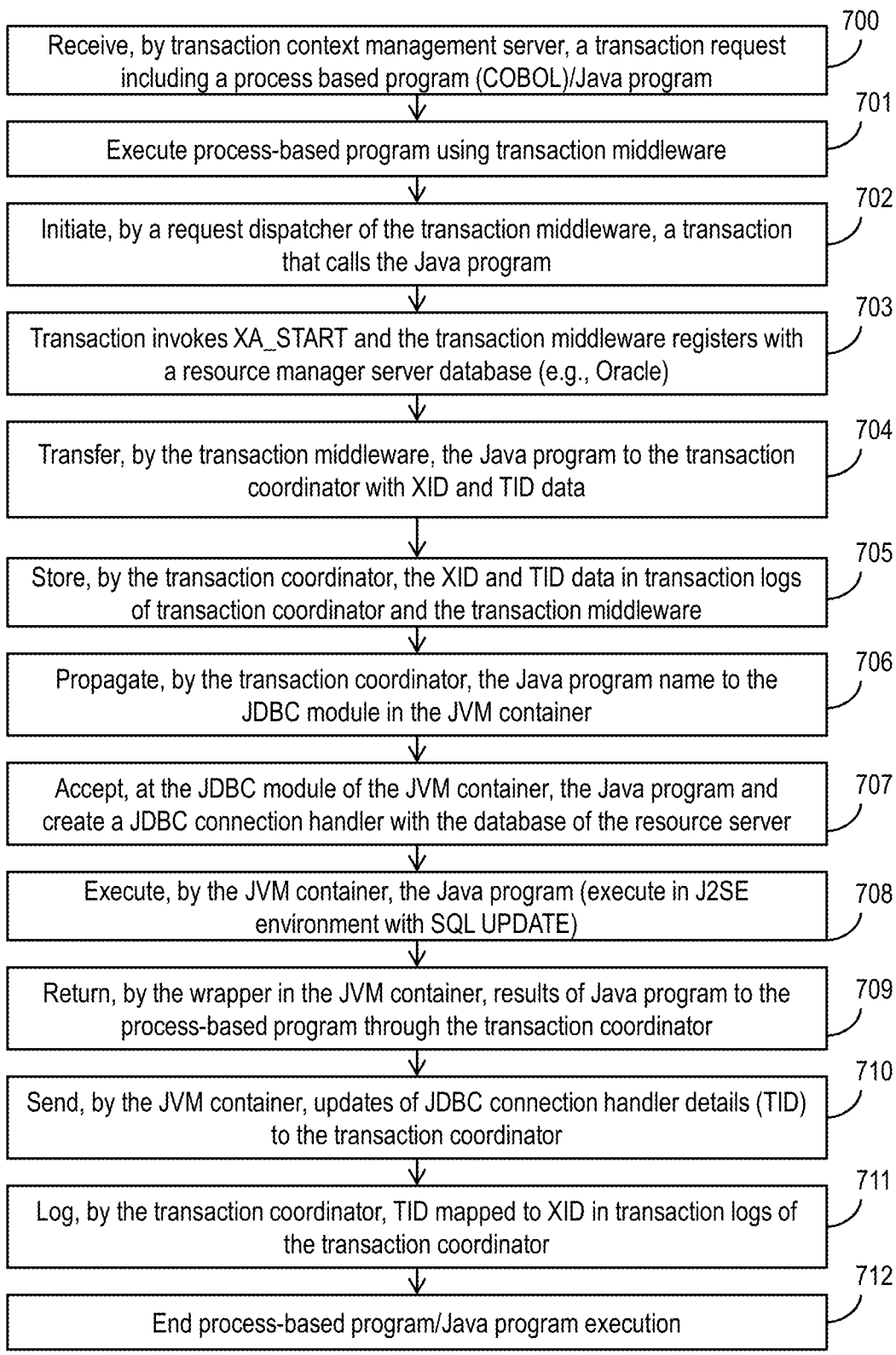
FIG. 7 shows a flowchart of a method in accordance with aspects of the invention.

FIG. 7 shows a flowchart of a method in accordance with aspects of the invention. Steps of the method of FIG. 7 may be performed in the environment illustrated in FIGS. 2 and 6, and are described with reference to elements shown in FIGS. 2 and 6.

At step 700 the transaction context management server 60 receives a transaction request from a user (e.g., user computer device 96), including process based program components (e.g., COBOL) and Java program components.

At step 701, the transaction middleware 64 executes the process-based program 66. By way of example, the process-based program 66 in FIG. 6 illustrates a COBOL based application program invoked to perform database updates.

At step 702, the request dispatcher 65 of the transaction middleware 64 initiates a transaction that calls the Java program 76. For example, FIG. 6 depicts a COBOL based application program (process-based program 66), that initiates a transaction calling a Java program 76.

At step 703, the transaction invokes a begin transaction command (e.g., XA_START) and the transaction middleware 64 registers with the resource manager server database 92. The transaction coordinator 62 in FIG. 6 performs the begin transaction command to the resource connection manager 70.

At step 704, the transaction middleware 64 transfers the Java program 76 to the transaction coordinator 62 with XID and TID data. For example, as depicted in FIG. 6, the process-based program 66 calls the Java program 76 (JPROG) using a EXEC CICS LINK API.

At step 705, the transaction coordinator 62 stores the XID and TID data in the transaction log 63 in a manner that maps the XID data to the TID data. As depicted in FIG. 6, the transaction coordinator 62 also stores the XID and TID data in TLOG (transaction log) 68, which is maintained by the transaction middleware 64.

At step 706, the transaction coordinator 62 propagates the name of the Java program 76 to the JDBC module 75 of the JVM container 72. FIG. 6 depicts the process-based program 66 invokes the Java program 'JPROG' through the EXEC CICS LINK API and the Java program name 'JPROG' is propagated through the transaction coordinator 62 to the JDBC module 75 of the JVM container 72.

At step 707, the JDBC module 75 accepts the Java program 76 and creates a JDBC connection handler with the database 92 of the resource manager server 90. FIG. 6 illustrates the Java program 76 performing resource updates such as a database update through a JDBC API that is managed through the JDBC connection with the resource server 90.

At step 708, the JVM container 72 executes the Java program 76. In aspects, the JVM container 72 executes in a J2SE environment with a JDBC update command (e.g., SQL UPDATE).

At step 709, the wrapper 74 of the JVM container 72 returns results of the Java program 76 to the process based program 66 through the transaction coordinator 62.

At step 710, the JVM container 72 sends updates of the JDBC connection details (such as TID) to the transaction coordinator 62.

At step 711, the transaction coordinator 62 logs TID and XID data in the transaction log 63 of the transaction coordinator 62, wherein the TID data is mapped to the XID data (for representing the transaction).

At step 712, execution of the process-based program components and Java program components ends.

Figure 8:
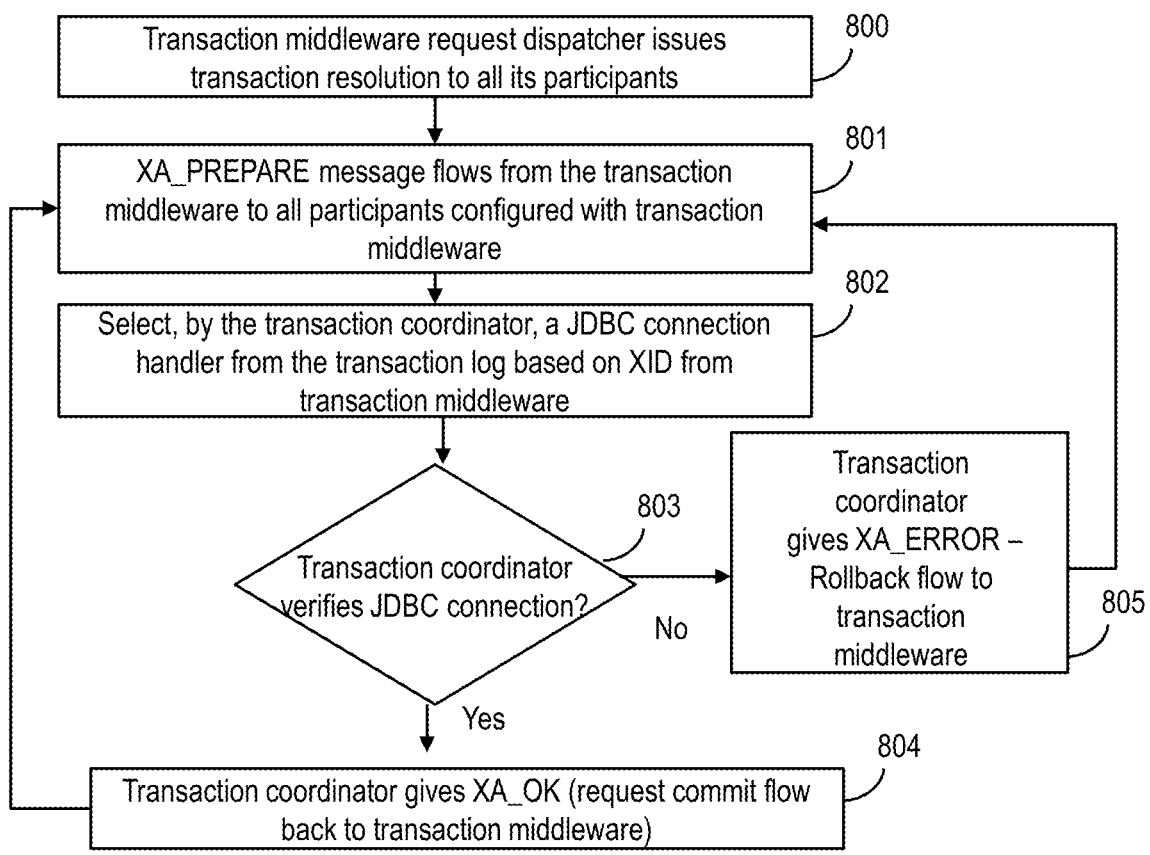
FIG. 8 shows a flowchart of a method in accordance with aspects of the invention.

FIG. 8 shows a flowchart of a method in accordance with aspects of the invention. Steps of the method of FIG. 8 may be performed in the environment illustrated in FIG. 2, and are described with reference to elements shown in FIG. 2. In the scenario of FIG. 8, the transaction of FIG. 7 has been completed successfully, and the execution of process-based program components and Java program components has ended.

At step 800, the transaction middleware 64 issues a transaction resolution message to all its participants, including the transaction coordinator 62 and the resource manager server 90.

At step 801, once the transaction resolution message issues at step 800, the transaction middleware 64 calls to request the XA compatible resource manager server 90 to prepare for commitment any work performed for the transaction (e.g., a XA_PREPARE function), which flows to all participants configured with the transaction middleware 64, including the transaction coordinator 62.

At step 802, the transaction coordinator 62 selects a JDBC connection (TID) based on XID data received from the transaction middleware 64.

At step 803, the transaction coordinator 62 verifies the JDBC connection (TID).

At step 804, after the JDBC connection (TID) is verified at step 803, the transaction coordinator 62 gives the OK command to request commit flow back to the transaction middleware 64 (e.g., XA_OK), and the process returns to step 801.

At step 805, if the JDBC connection (TID) is not verified at step 803, then the transaction coordinator 62 gives the Error command to request rollback flow back to the transaction middleware 64 (e.g., XA_ERROR), and the process returns to step 801.

Figure 9:
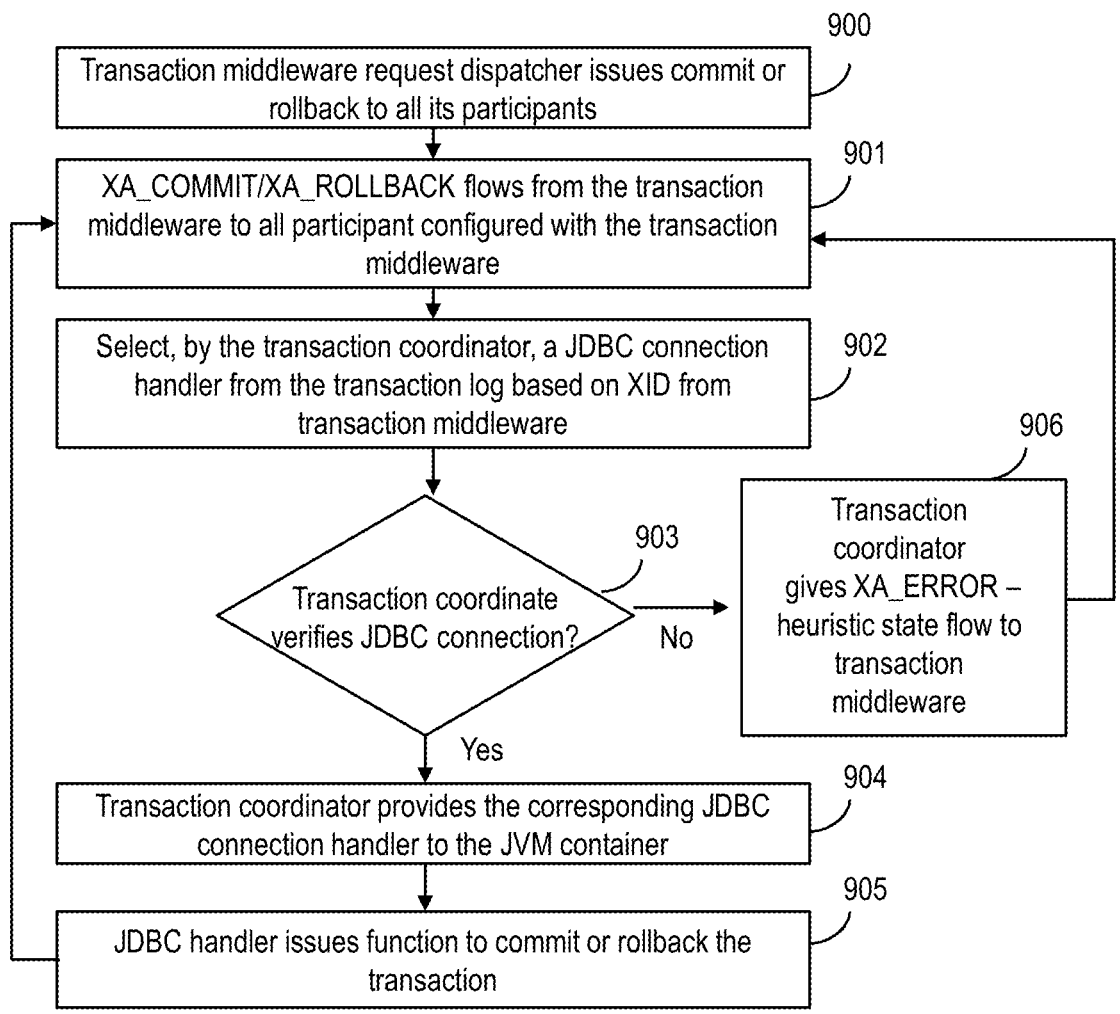
FIG. 9 shows a flowchart of a method in accordance with aspects of the invention.

FIG. 9 shows a flowchart of a method in accordance with aspects of the invention. Steps of the method of FIG. 9 may be performed in the environment illustrated in FIG. 2, and are described with reference to elements shown in FIG. 2.

FIG. 9 illustrates the scenario wherein the transaction coordinator 62 has called a prepare function (e.g., XA_PREPARE) to request the resource manager sever 90 prepare for commitment any work performed on for the transaction of FIG. 7. The resource manager server 90 places any resources that are held or modified in such a state that it can make the results permanent when it receives a commit request. Once this function successfully returns, the resource manager server 90 must guarantee that the transaction branch can be either committed or rolled back regardless of failures. The resource manager server 90 cannot erase its knowledge of the transaction until the resource manager server 90 calls either a commit function (e.g., XA_COMMIT) or a rollback function (e.g., XA_ROLLBACK) to complete the transaction.

At step 900, the request dispatcher 65 of the transaction middleware 64 issues a commit (e.g., XA_COMMIT) or rollback (e.g., XA_ROLLBACK) function to all its participants, including the transaction coordinator 62 and the resource manager server 90.

At step 901, the commit or rollback function flows to all participants configured with the transaction middleware 64, including the transaction coordinator 62 and the resource manager server 90.

At step 902, the transaction coordinator 62 selects a JDBC connection (TID) based on XID data received from the transaction middleware 64.

At step 903, the transaction coordinator 62 verifies the JDBC connection (TID).

At step 904, once the transaction coordinator 62 verifies the JDBC connection (TID), the transaction coordinator 62 provides the corresponding JDBC connection (TID) to the JVM container 72.

At step 905, the JDBC connection handler issues commit or rollback functions (to commit or rollback the transaction), and the process returns to step 901.

At step 906, if the transaction coordinator 62 does not verify the JDBC connection at step 903, then the transaction coordinator 62 issues an Error command to request heuristic state flow back to the transaction middleware 64 (e.g., XA_ERROR), and the process returns to step 901.

FIG. 9 illustrates the scenario where the transaction middleware 64 receives a prepare function (e.g., XA_PREPARE) successful response message from the transaction coordinator 62 (e.g., XA_PREPARE message requests a resource manager to prepare for commitment any work performed for a transaction). A transaction resolution with a commit message (e.g., XA_COMMIT) then flows from the transaction middleware 64 to the transaction coordinator 62 for committing the transaction. Once the transaction coordinator 62 matches the corresponding XID with a JDBC connection handler, the JDBC module 75 performs commit or rollback functions for the transaction with the JDBC connection handler, and replies back to the transaction coordinator 62 with a result.

Figure 10:
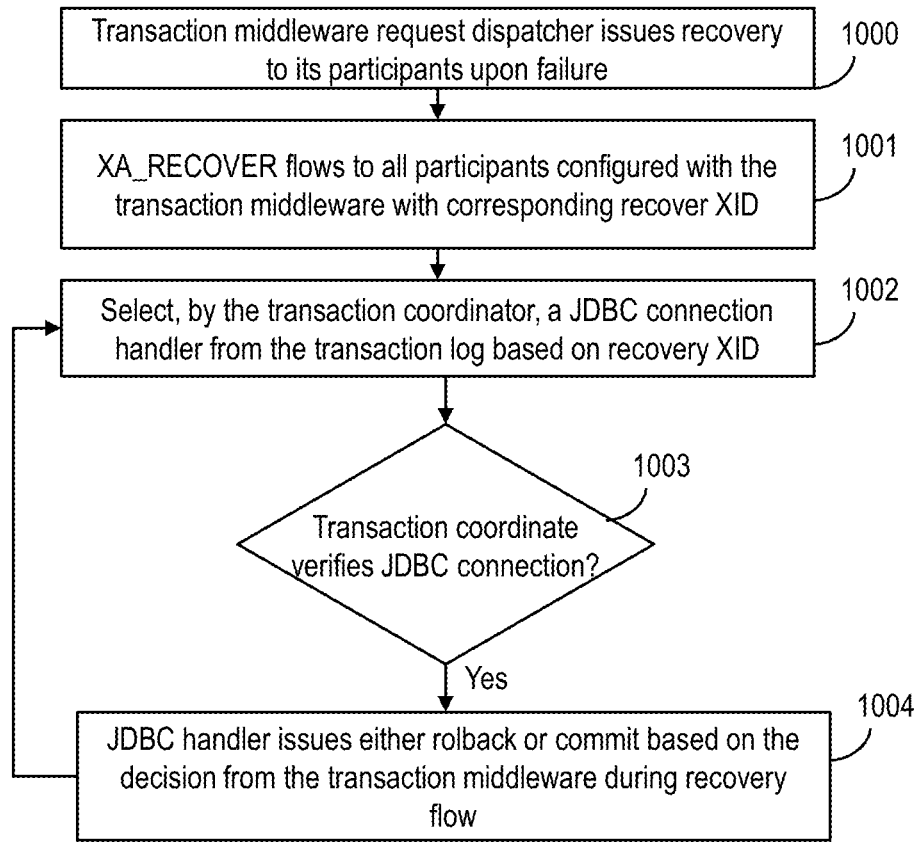
FIG. 10 shows a flowchart of a method in accordance with aspects of the invention.

FIG. 10 shows a flowchart of a method in accordance with aspects of the invention. Steps of the method of FIG. 10 may be performed in the environment illustrated in FIG. 2, and are described with reference to elements shown in FIG. 2. FIG. 10 illustrates a scenario wherein the transaction middleware 64 issues a recovery message to the transaction coordinator 62 upon the transaction middleware's 64 failure after a prepare request (e.g., after XA_PREPARE message requests the resource manager server 90 to prepare for commitment any work performed for a transaction).

At step 1000, the transaction middleware 64 issues a recover command (e.g., XA_RECOVER) to all its participants (including the transaction coordinator 62 and the resource manager server 90) upon a failure of a transaction. The recovery function is utilized during recovery to obtain a list of transaction branches that are currently in a prepared or heuristically completed state.

At step 1001, the recovery command (e.g., XA_RECOVER) flows to all participants configured with the transaction middleware 64, including the transaction coordinator 62 and the resource manager server 90.

At step 1002, the transaction coordinator 62 selects a JDBC connection handler based on recover XID data received from the transaction middleware 64.

At step 1003, transaction coordinator 62 verifies the JDBC connection handler.

At step 1004, once the transaction coordinator 62 verifies the JDBC connection handler, the transaction coordinator 62 issues either a rollback (e.g., XA_ROLLBACK) or commit (e.g., XA_COMMIT) command to the transaction middleware 64, based on a decision from the transaction middleware 64 during the recovery flow. The process then returns to step 1002.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for sharing transactional context between Java and traditional language applications. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, a transaction request to execute a program, wherein the program comprises non-Java program components and Java program components and in response to the transaction request:
   executing, by a transaction middleware of the computing device, the non-Java program components;
   transferring, by the transaction middleware, the Java program components to a transaction coordinator of the computing device, along with thread ID data and global transaction ID data, wherein the thread ID data and the global transaction ID data are stored in a recoverable transaction log store;
   receiving, by the transaction coordinator, updated thread ID data from a Java Virtual Machine (JVM) container subsequent to the JVM container executing the Java program components of the program, wherein the JVM container updates the thread ID data upon execution of the Java program components; and
   logging, by the transaction coordinator, the updated thread ID data received from the JVM container and the global transaction ID data in the recoverable transaction log store after the execution of the Java program components by the JVM container, wherein the updated thread ID data is mapped to the global transaction ID data.

2. The computer-implemented method of claim 1, further comprising contacting, by the transaction middleware, a resource manager server and registering with the resource manager server using the global transaction ID data, wherein the Java program component communicates with the resource manager server, and wherein the resource manager server is an extended Architecture compatible resource manager server.

3. The computer-implemented method of claim 1, further comprising:
   issuing, by the transaction middleware, a transaction resolution message to the transaction coordinator;
   issuing, by the transaction middleware, a prepare message to the transaction coordinator to prepare for commitment any work performed for the transaction;
   selecting, by the transaction coordinator, a connection handler based on the global transaction ID from the transaction middleware; and
   issuing, by the transaction coordinator, an okay command to the transaction middleware to request commit flow back to the transaction middleware.

4. The computer-implemented method of claim 1, further comprising:
   issuing, by the transaction middleware, a commit message or a rollback message to the transaction coordinator;
   selecting, by the transaction coordinator, a Java database connectivity (JDBC) connection handler from the recoverable transaction log store of the transaction coordinator based on the global transaction ID data received from the transaction middleware;
   verifying, by the transaction coordinator, the JDBC connection handler;
   providing, by the transaction coordinator, the JDBC connection handler to the JVM container; and
   issuing, by the JDBC connection handler, a commit message or a rollback message to the transaction middleware.

5. The computer-implemented method of claim 1, further comprising:
   issuing, by the transaction middleware, a recovery message to the transaction coordinator, along with recover global transaction ID data;
   selecting, by the transaction coordinator, a JDBC connection handler from the recoverable transaction log store, a JDBC connection handler based on the recovery global transaction ID data received from the transaction middleware;
   verifying, by the transaction coordinator, the JDBC connection handler; and
   issuing, by the JDBC connection handler, rollback or commit messages based on a decision received from the transaction middleware during recovery flow.

6. The computer-implemented method of claim 1, wherein the non-Java program component is a COBOL program.

7. The computer-implemented method of claim 1, wherein the Java program components are transferred to the transaction coordinator using an application programming interface (API).

8. A computer program product for sharing transactional context between a Java application and a process-based application, the computer program product comprising a computer readable storage medium having program instructions embodied therewith, the program instructions executable by a computing device to cause the computing device to:
   receive a transaction request to execute a program, wherein the program comprises non-Java program components and Java program components and in response to the transaction request:
   execute, by a transaction middleware of the computing device, the non-Java program components;
   transfer, by the transaction middleware, the Java program components to a transaction coordinator of the computing device, along with thread ID data and global transaction ID data, wherein the thread ID data and the global transaction ID data are stored in a recoverable transaction log store;

receive, by the transaction coordinator, updated thread ID data from a Java Virtual Machine (JVM) container subsequent to the JVM container executing the Java program components of the program, wherein the JVM container updates the thread ID data upon execution of the Java program components; and log, by the transaction coordinator, the updated thread ID data received from the JVM container and the global transaction ID data in the recoverable transaction log store after the execution of the Java program components by the JVM container, wherein the updated thread ID data is mapped to the global transaction ID data.

9. The computer program product of claim 8, wherein the program instructions further cause the computing device to contact, by the transaction middleware, a resource manager server and registering with the resource manager server using the global transaction ID data, wherein the Java program component communicates with the resource manager server, and wherein the resource manager server is an extended Architecture compatible resource manager server.

10. The computer program product of claim 8, wherein the program instructions further cause the computing device to:
issue, by the transaction middleware, a transaction resolution message to the transaction coordinator;
issue, by the transaction middleware, a prepare message to the transaction coordinator to prepare for commitment any work performed for the transaction;
select, by the transaction coordinator, a connection handler based on the global transaction ID from the transaction middleware; and
issue, by the transaction coordinator, an okay command to the transaction middleware to request commit flow back to the transaction middleware.

11. The computer program product of claim 8, wherein the program instructions further cause the computing device to:
issue, by the transaction middleware, a commit message or a rollback message to the transaction coordinator;
select, by the transaction coordinator, a Java database connectivity (JDBC) connection handler from the recoverable transaction log store of the transaction coordinator based on the global transaction ID received from the transaction middleware;
verify, by the transaction coordinator, the JDBC connection handler;
provide, by the transaction coordinator, the JDBC connection handler to the JVM container; and
issue, by the JDBC connection handler, a commit message or a rollback message to the transaction middleware.

12. The computer program product of claim 8, wherein the program instructions further cause the computing device to:
issue, by the transaction middleware a recovery message to the transaction coordinator, along with recovery global transaction ID data;
select, by the transaction coordinator, a JDBC connection handler from the recoverable transaction log store, a JDBC connection handler based on the recovery global transaction ID data received from the transaction middleware;
verify, by the transaction coordinator, the JDBC connection handler; and
issue, by the JDBC connection handler, rollback or commit messages based on a decision received from the transaction middleware during recovery flow.

13. The computer program product of claim 8, wherein the non-Java program component is a COBOL program.

14. The computer program product of claim 8, wherein the Java program is a Java Platform, Standard Edition (J2SE) Java program.

15. A system for sharing transactional context between a Java application and a process-based application, comprising:
a CPU, a computer readable memory and a computer readable storage medium associated with a computing device;
program instructions to receive a transaction request to execute a program, wherein the program is written to include non-Java process based program components and Java program components;
in response to the transaction request:
program instructions to execute, by a transaction middleware of the computing device, the non-Java program components;
program instructions to transfer, by the transaction middleware, the Java program components to a transaction coordinator of the computing device, along with thread ID data and global transaction ID data, wherein the thread ID data and the global transaction ID data are stored in a recoverable transaction log store;
program instructions to return results from execution of the Java program components by a JVM container to the non-Java process based program components through the transaction coordinator;
program instructions to receive, by the transaction coordinator, updated thread ID data from the JVM container subsequent to the JVM container executing the Java program components of the program, wherein the JVM container updates the thread ID data upon execution of the Java program components; and
program instructions to log, by the transaction coordinator, the updated thread ID data received from the JVM container and the global transaction ID data in the recoverable transaction log store after the execution of the Java program components by the JVM container, wherein the updated thread ID data is mapped to the global transaction ID data;
wherein the program instructions are stored on the computer readable storage medium and executed by the CPU via the computer readable memory.

16. The system of claim 15, further comprising:
program instructions to issue, by the transaction middleware, a transaction resolution message to the transaction coordinator; program instructions to issue, by the transaction middleware, a prepare message to the transaction coordinator to prepare for commitment any work performed for the transaction;
program instructions to select, by the transaction coordinator, a connection handler based on the global transaction ID from the transaction middleware; and
program instructions to issue, by the transaction coordinator, an okay command to the transaction middleware to request commit flow back to the transaction middleware.

17. The system of claim 15, further comprising:
program instructions to issue, by the transaction middleware, a commit message or a rollback message to the transaction coordinator;
program instructions to select, by the transaction coordinator, a Java database connectivity (JDBC) connection handler from the recoverable transaction log store of the transaction coordinator based on the global transaction ID received from the transaction middleware;

program instructions to verify, by the transaction coordinator, the JDBC connection handler;

program instructions to provide, by the transaction coordinator, the JDBC connection handler to the JVM container; and program instructions to issue, by the JDBC connection handler, a commit message or a rollback message to the transaction middleware.

18. The system of claim 15, further comprising:

program instructions to issue, by the transaction middleware a recovery message to the transaction coordinator, along with recovery global transaction ID data;

program instructions to select, by the transaction coordinator, a Java database connectivity (JDBC) connection handler from the recoverable transaction log store based on the recovery global transaction ID data received from the transaction middleware;

program instructions to verify, by the transaction coordinator, the JDBC connection handler; and program instructions to issue, by the JDBC connection handler, rollback or commit messages based on a decision received from the transaction middleware during recovery flow.

19. The system of claim 15, further comprising program instructions to contact, by the transaction middleware, a resource manager server and registering with the resource manager server using the global transaction ID data, wherein the non-Java program component is a COBOL program and the resource manager server is an extended Architecture compatible resource manager server.

20. The system of claim 15, wherein the Java program is a Java Platform, Standard Edition (J2SE) Java program.

\* \* \* \* \*